US010969983B2

(12) United States Patent
Deng et al.

(10) Patent No.: US 10,969,983 B2
(45) Date of Patent: Apr. 6, 2021

(54) METHOD FOR IMPLEMENTING NVME OVER FABRICS, TERMINAL, SERVER, AND SYSTEM

(71) Applicant: Huawei Technologies Co., Ltd., Shenzhen (CN)

(72) Inventors: Shiping Deng, Hangzhou (CN); Hongguang Liu, Hangzhou (CN); Haitao Guo, Hangzhou (CN); Xin Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 606 days.

(21) Appl. No.: 15/802,690

(22) Filed: Nov. 3, 2017

(65) Prior Publication Data

US 2018/0067685 A1 Mar. 8, 2018

Related U.S. Application Data

(63) Continuation of application No. PCT/CN2016/095694, filed on Aug. 17, 2016.

(30) Foreign Application Priority Data

Nov. 19, 2015 (CN) .......................... 201510812695.8

(51) Int. Cl.
*G06F 15/167* (2006.01)
*G06F 3/06* (2006.01)
(Continued)

(52) U.S. Cl.
CPC ............ *G06F 3/0647* (2013.01); *G06F 3/061* (2013.01); *G06F 3/067* (2013.01); *G06F 3/0613* (2013.01);
(Continued)

(58) Field of Classification Search
CPC ...... G06F 3/0647; G06F 3/0688; G06F 13/28; G06F 3/061; G06F 3/0656; G06F 3/0613;
(Continued)

(56) References Cited

U.S. PATENT DOCUMENTS

2008/0147904 A1\* 6/2008 Freimuth ................ G06F 13/28
710/22
2013/0198311 A1\* 8/2013 Tamir ...................... G06F 3/061
709/212
(Continued)

FOREIGN PATENT DOCUMENTS

CN 102185925 A 9/2011
CN 103019622 A 4/2013
(Continued)

OTHER PUBLICATIONS

NVM Express Workgroup, "NVM Express", Revision 1.2, c/o Virtual, Inc., Nov. 3, 2017, 204 pages.
(Continued)

Primary Examiner — John B Walsh
(74) Attorney, Agent, or Firm — Slater Matsil, LLP

(57) ABSTRACT

A method for implementing NVMe over fabrics includes generating, by a terminal, a NVMe instruction, where the NVMe instruction indicates a data read operation or a data write operation. The method further includes sending, by the terminal by using remote direct memory access (RDMA), the NVMe instruction to a submission queue (SQ) that is stored in a server. When the NVMe instruction indicates the data read operation, the method includes receiving, by the terminal by using the RDMA, to-be-read data sent by the server. Alternatively, when the NVMe instruction indicates the data write operation, the method includes sending, by the terminal, to-be-written data to the server by using the RDMA. The method further includes receiving, by the terminal, an NVMe completion instruction sent by using the
(Continued)

RDMA by the server; and writing, by the terminal, the NVMe completion instruction into a completion queue (CQ) that is set in the terminal.

19 Claims, 9 Drawing Sheets

(51) Int. Cl.
  *H04L 12/46* (2006.01)
  *G06F 13/28* (2006.01)
  *G06F 15/173* (2006.01)
  *H04L 29/06* (2006.01)
(52) U.S. Cl.
  CPC .......... *G06F 3/0656* (2013.01); *G06F 3/0688* (2013.01); *G06F 13/28* (2013.01); *G06F 15/17331* (2013.01); *H04L 12/4625* (2013.01); *H04L 67/42* (2013.01); *G06F 2213/0026* (2013.01)
(58) Field of Classification Search
  CPC ............... G06F 3/067; G06F 15/17331; G06F 2213/0026; H04L 12/4625; H04L 67/42
  See application file for complete search history.

(56) References Cited

U.S. PATENT DOCUMENTS

| | | |
|---|---|---|
| 2014/0337540 A1 | 11/2014 | Johnson et al. |
| 2015/0169244 A1 | 6/2015 | Asnaashari et al. |
| 2015/0261434 A1 | 9/2015 | Kagan et al. |

FOREIGN PATENT DOCUMENTS

| | | |
|---|---|---|
| CN | 104111907 A | 10/2014 |
| CN | 104536701 A | 4/2015 |
| CN | 104601729 A | 5/2015 |
| EP | 3147792 A1 | 3/2017 |
| WO | 2013109640 A1 | 7/2013 |

OTHER PUBLICATIONS

Mellanox Technologies, "RDMA Aware Networks Programming User Manual Rev 1.4", 2013, 237 pages.

\* cited by examiner

METHOD FOR IMPLEMENTING NVME OVER FABRICS, TERMINAL, SERVER, AND SYSTEM

CROSS-REFERENCE TO RELATED APPLICATIONS

This application is a continuation of International Application No. PCT/CN2016/095694, filed on Aug. 17, 2016, which claims priority to Chinese Patent Application No. 201510812695.8, filed on Nov. 19, 2015. The disclosures of the aforementioned applications are hereby incorporated by reference in their entireties.

TECHNICAL FIELD

The present invention relates to the field of data transmission, and in particular, to a method for implementing NVMe over fabrics, a terminal, a server, and a system.

BACKGROUND

In a conventional storage architecture, due to a limitation of an access speed of a hard disk, previously, a serial advanced technology attachment (SATA) and a serial attached small computer system interface (SAS) can completely meet bandwidth requirements of the hard disk. However, as a flash speed is increased by hundreds of times, an interface bandwidth becomes the largest bottleneck of an input/output (I/O) port. Success of Fusion-io of the AMD Inc. directly stems from its developed patent PCIe (Peripheral Component Interconnect Express flash memory card, which may be added to a server to further accelerate an application, and achieve a low access delay at a microsecond level, but the SATA/SAS can by no means achieve this level.

Therefore, in the flash memory era, interface specifications need to be changed significantly. A non-volatile memory express (NVMe) standard formulated for a PCIe interface emerges accordingly. Currently, an NVMe is an extensible host control chip interface standard developed for enterprise and common client systems that use PCIe solid state drives (SSD).

Because NVMe technology expansion based on local storage is relatively difficult, application scenarios are extremely limited, and a high concurrency advantage of the NVMe cannot be exploited. With further development of the NVMe technology, NVMe over fabrics (NOF) appears. For example, a manner of combining a remote direct memory access (RDMA) protocol and an NVMe protocol is used to implement the NOF.

However, because complex interaction and processing procedures are needed to complete one NVMe operation only by simply combining the NVMe protocol and the RDMA protocol, NOF performance is poor.

SUMMARY

In accordance with a first aspect of the embodiments of the present invention a method for implementing NVMe over fabrics is described. The method includes generating, by a terminal, a NVMe instruction, where the NVMe instruction indicates a data read operation or a data write operation. The method further includes sending, by the terminal by using remote direct memory access (RDMA), the NVMe instruction to a submission queue (SQ) that is stored in a server. When the NVMe instruction indicates the data read operation, the method includes receiving, by the terminal by using the RDMA, to-be-read data sent by the server. Alternatively, when the NVMe instruction indicates the data write operation, the method includes sending, by the terminal, to-be-written data to the server by using the RDMA. The method further includes receiving, by the terminal, an NVMe completion instruction sent by using the RDMA by the server; and writing, by the terminal, the NVMe completion instruction into a completion queue (CQ) that is stored in the terminal.

With reference to the first aspect, in a first possible implementation of the first aspect, the sending, by the terminal by using RDMA, the NVMe instruction to an SQ that is set in a server may include: converting, by the terminal, the NVMe instruction into a first work queue element (Work Queue Element, WQE) supported by the RDMA; and sending, by a first RDMA transceiver module of the terminal, the first WQE to a second RDMA transceiver module of the server, so that the second RDMA transceiver module parses the first WQE into the NVMe instruction and writes the NVMe instruction into the SQ.

With reference to the first possible implementation of the first aspect, in a second possible implementation of the first aspect, if the NVMe instruction indicates the data write operation, before the sending, by the terminal, to-be-written data to the server by using the RDMA, the method may further include: receiving, by the terminal, an RDMA read request initiated, by the server by using the second RDMA transceiver module, to the first RDMA transceiver module.

With reference to the first possible implementation of the first aspect, in a third possible implementation of the first aspect, the receiving, by the terminal, an NVMe completion instruction sent by using the RDMA by the server may include: receiving, by the first RDMA transceiver module, a second WQE sent, by the server by using the second RDMA transceiver module, to the first RDMA transceiver module; and parsing, by the first RDMA transceiver module, the second WQE into the NVMe completion instruction.

With reference to the first possible implementation of the first aspect or the second possible implementation of the first aspect or the third possible implementation of the first aspect, in a fourth possible implementation of the first aspect, if the NVMe instruction indicates the data read operation, the receiving, by the terminal by using the RDMA, to-be-read data sent by the server is specifically: receiving, by the first RDMA transceiver module, the to-be-read data sent by the second RDMA transceiver module.

With reference to the first aspect or the first possible implementation of the first aspect or the second possible implementation of the first aspect or the third possible implementation of the first aspect, in a fifth possible implementation of the first aspect, the method further includes: reading, by the server, the NVMe instruction from the SQ.

A second aspect of the embodiments of the present invention further provides a method for implementing NVMe over fabrics. The method includes receiving, by a server, an NVMe instruction sent by using remote direct memory access (RDMA) by a terminal, and writing the NVMe instruction into a submission queue SQ that is set in the server. The NVMe instruction indicates a data read operation or a data write operation. The method further includes reading, by the server, the NVMe instruction from the SQ. When the NVMe instruction indicates the data read operation, the method includes sending, by the server, a to-be-read data to the terminal by using the RDMA. Alternatively, when the NVMe instruction indicates the data write operation, the method includes receiving, by the server by using the RDMA, to-be-written data sent by the terminal.

The method further includes generating, by the server, an NVMe completion instruction; and sending, by the server by using the RDMA, the NVMe completion instruction to a CQ that is set in the terminal.

With reference to the second aspect, in a first possible implementation of the second aspect, the receiving, by a server, an NVMe instruction sent by using RDMA by a terminal may include: receiving, by the server by using a second RDMA transceiver module of the server, a first WQE sent by a first RDMA transceiver module of the terminal; and parsing, by the server, the first WQE into the NVMe instruction.

With reference to the first possible implementation of the second aspect, in a second possible implementation of the second aspect, when the NVMe instruction indicates the data read operation, the sending, by the server, to-be-read data to the terminal by using the RDMA is specifically: sending, by the server, the to-be-read data to the first RDMA transceiver module by using the second RDMA transceiver module.

With reference to the first possible implementation of the second aspect, in a third possible implementation of the second aspect, if the data write operation is determined according to the NVMe instruction, before the receiving, by the server by using the RDMA, to-be-written data sent by the terminal, the method may further include: initiating, by the server, an RDMA read operation to the first RDMA transceiver module by using the second RDMA transceiver module.

With reference to the first possible implementation of the second aspect or the second possible implementation of the second aspect or the third possible implementation of the second aspect, in a fourth possible implementation of the second aspect, the sending, by the server, the NVMe completion instruction to the terminal by using the RDMA may include: converting, by the server, the NVMe completion instruction into a second WQE supported by the RDMA; and sending, by the server, the second WQE to the first RDMA transceiver module by using the second RDMA transceiver module.

A third aspect of the embodiments of the present invention further provides a terminal. The terminal may include: a first processing module, configured to generate a non-volatile memory express NVMe instruction, where the NVMe instruction indicates a data read operation or a data write operation; and a first RDMA transceiver module, configured to send, by using RDMA, the NVMe instruction to an SQ that is set in a server, where the first RDMA transceiver module is further configured to: when the NVMe instruction indicates the data read operation, receive, by using the RDMA, to-be-read data sent by the server; or when the NVMe instruction indicates the data write operation, send to-be-written data to the server by using the RDMA; the first RDMA transceiver module is further configured to receive an NVMe completion instruction sent by using the RDMA by the server; and the first processing module is further configured to write the NVMe completion instruction into a CQ that is set in the terminal.

With reference to the third aspect, in a first possible implementation of the third aspect, the first RDMA transceiver module includes: a first conversion unit, configured to convert the NVMe instruction into a first work queue element WQE supported by the RDMA; and a first transceiver unit, configured to send the first WQE to a second RDMA transceiver module of the server, so that the second RDMA transceiver module parses the first WQE into the NVMe instruction and writes the NVMe instruction into the SQ.

With reference to the first possible implementation of the third aspect, in a second possible implementation of the third aspect, the first transceiver unit is further configured to: receive an RDMA read request initiated, by the server by using the second RDMA transceiver module, to the first RDMA transceiver module.

With reference to the first possible implementation of the third aspect, in a third possible implementation of the third aspect, the first transceiver unit is further configured to: receive a second WQE sent, by the server by using the second RDMA transceiver module, to the first RDMA transceiver module; and the first conversion unit is further configured to: parse the second WQE into the NVMe completion instruction.

With reference to the first possible implementation of the third aspect or the second possible implementation of the third aspect or the third possible implementation of the third aspect, in a fourth possible implementation of the third aspect, the first transceiver unit is further specifically configured to: receive the to-be-read data sent by the second RDMA transceiver module.

A fourth aspect of the embodiments of the present invention further provides a server. The server serves as a server, and the server may include: a second RDMA transceiver module, configured to: receive an NVMe instruction sent by using RDMA by a terminal, and write the NVMe instruction into an SQ that is set in the server, where the NVMe instruction indicates a data read operation or a data write operation; and a second processing module, configured to read the NVMe instruction from the SQ, where the second RDMA transceiver module is further configured to: when the NVMe instruction indicates the data read operation, send to-be-read data to the terminal by using the RDMA; or when the NVMe instruction indicates the data write operation, receive, by using the RDMA, to-be-written data sent by the terminal; the second processing module is further configured to generate an NVMe completion instruction; and the second RDMA transceiver module is further configured to: send the NVMe completion instruction to the terminal by using the RDMA.

With reference to the fourth aspect, in a first possible implementation of the fourth aspect, the second RDMA transceiver module includes: a second transceiver unit, configured to receive a first WQE sent by a first RDMA transceiver module of the terminal; and a second conversion unit, configured to parse the first WQE into the NVMe instruction.

With reference to the first possible implementation of the fourth aspect, in a second possible implementation of the fourth aspect, the second transceiver unit is further specifically configured to: send the to-be-read data to the first RDMA transceiver module.

With reference to the first possible implementation of the fourth aspect, in a third possible implementation of the fourth aspect, the second transceiver unit is further configured to: initiate an RDMA read operation to the first RDMA transceiver module.

With reference to the first possible implementation of the fourth aspect or the second possible implementation of the fourth aspect or the third possible implementation of the fourth aspect, in a fourth possible implementation of the fourth aspect, the second transceiver unit is further configured to: convert the NVMe completion instruction into a second WQE supported by the RDMA; and the second transceiver unit is further configured to: send the second WQE to the first RDMA transceiver module.

A fifth aspect of the embodiment of the present invention further provides an NVMe over fabrics system. The system may include: a terminal, configured to generate a non-volatile memory express NVMe instruction, where the NVMe instruction indicates a data read operation or a data write operation; and the terminal is further configured to send, by using remote direct memory access RDMA, the NVMe instruction to a submission queue SQ that is set in a server; and the server, configured to read the NVMe instruction from the SQ, where when the NVMe instruction indicates the data read operation, the server sends to-be-read data to the terminal by using the RDMA; or when the NVMe instruction indicates the data write operation, the terminal sends to-be-written data to the server by using the RDMA; the server is further configured to receive the to-be-written data; when the server completes the data read operation or the data write operation indicated by the NVMe instruction, the server is further configured to generate an NVMe completion instruction; and the server is further configured to send, by using the RDMA, the NVMe completion instruction to a CQ that is set in the terminal.

With reference to the fifth aspect, in a first possible implementation of the fifth aspect, that when the NVMe instruction indicates the data write operation, the terminal sends to-be-written data to the server by using the RDMA includes: when the NVMe instruction indicates the data write operation, initiating, by the server, an RDMA read request to the terminal; receiving, by the terminal, the RDMA read request; and sending, by the terminal by using the RDMA, the to-be-written data to the server according to the RDMA read request.

It can be seen from the foregoing technical solutions that, the embodiments of the present invention have the following advantages: The completion queue (CQ) in an NVMe is set in the terminal, the submission queue (SQ) in the NVMe is set in the server, the terminal communicates with the server by using the remote direct memory access (RDMA), that is, the NVMe instruction generated by the terminal is sent to the SQ in the server by the terminal by using the RDMA, and corresponding operations may be executed according to different NVMe instructions. If the NVMe instruction indicates the data read operation, the terminal receives, by using the RDMA, the to-be-read data sent by the server. If the NVMe instruction indicates the data write operation, the terminal sends the to-be-written data to the server by using the RDMA. Then, the terminal receives, by using the RDMA, the NVMe completion instruction sent by the server, and writes the NVMe completion instruction into the CQ in the terminal. Writing the NVMe completion instruction into the CQ indicates that one data read operation or data write operation has been completed. In the solutions of the embodiments of the present invention, the RDMA and the NVMe are combined, the CQ in the NVMe is set in the terminal, and the SQ in the NVMe is set in the server, so that a quantity of interactions between the terminal and the server in one NVMe operation can be decreased and CQ processing complexity can be reduced, thereby improving NOF performance.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Embodiments of the present invention provide a method for implementing NVMe over fabrics, a terminal, a server, and a system so that a quantity of interactions between a terminal and a server in one NVMe operation can be decreased and processing procedure complexity can be reduced, thereby improving NOF performance. Embodiments of the present invention provide a method for implementing NVMe over fabrics, a terminal, a server, and a system, to use fabric-attached storage for an NVMe technology instead of local storage, so as to enlarge an application scope of the NVMe technology and exploit a high concurrency advantage of an NVMe.

To make persons skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

The following separately provides detailed descriptions.

In the specification, claims, and accompanying drawings of the present invention, the terms "first", "second", "third", "fourth", and so on (if existent) are intended to distinguish between similar objects but do not necessarily indicate a specific order or sequence. It should be understood that data termed in such a way is interchangeable in proper circumstances so that the embodiments of the present invention described herein can be implemented in other orders than the order illustrated or described herein. In addition, the terms "include", "comprise" and any other variants mean to cover non-exclusive inclusion, for example, a procedure, method, system, product, or device that includes a series of steps or modules is not necessarily limited to those expressly listed steps or modules, but may include other steps or modules not expressly listed or inherent to such a procedure, method, system, product, or device.

Figure 1A:
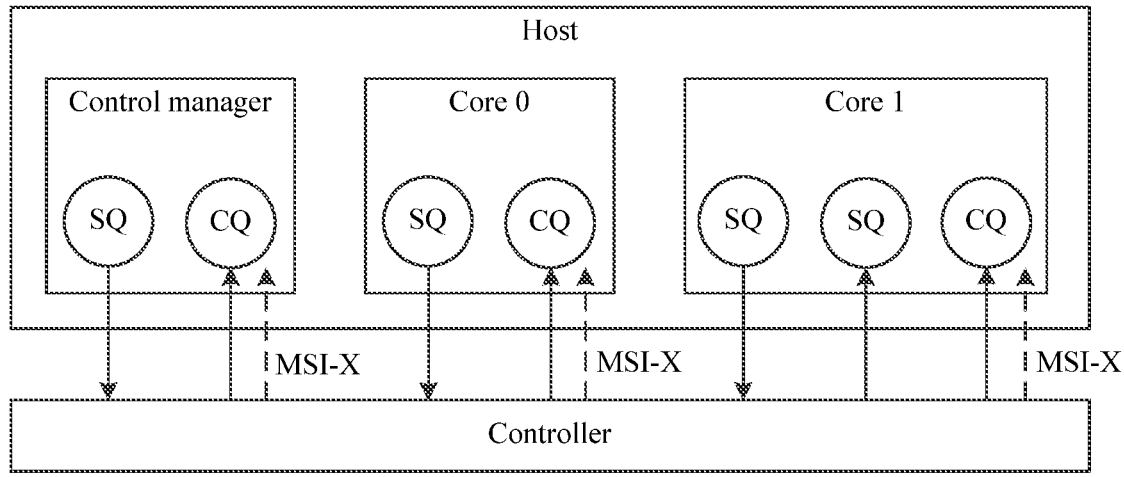
FIG. 1a is a schematic diagram of an existing NVMe working process.

An existing NVMe protocol is mainly applied locally. Referring to FIG. 1a, FIG. 1a is a schematic diagram of an existing NVMe working process. There are mainly a host and a controller. A queue in an NVMe is classified into an administration queue and an I/O queue. The controller communicates with the host in an interruption manner of message signaled interrupts (Message Signaled Interrupts, MSI)-X. The host delivers a command to the controller by using an SQ. After completing the command, the controller returns a command completion status to the host by using a CQ. Using the administration queue as an example, a management controller of the host delivers an administration command to the controller by using an administrative SQ, and after completing the administration command, the controller sends an administrative CQ to the management controller of the host, indicating that the administration command delivered by the host has been completed. Then, using the I/O queue as an example, a core of the host delivers an I/O command to the controller by using an I/O-type SQ, and after completing the I/O command, the controller sends an I/O-type CQ to the core of the host that delivers the I/O command, indicating that the I/O command delivered by the host has been completed.

It can be seen from the foregoing that, because NVMe protocol is mainly used in local, an application scenario of the NVMe protocol is limited. Therefore, expansion is relatively difficult, and the high concurrency advantage of the NVMe cannot be exploited. For example, nothing can be done when remote fabric-attached data storage similar to RDMA is required. However, fabric-attached storage is applied more widely in the existing storage field. Therefore, it is necessary to improve the NVMe protocol, so that the NVMe over fabrics can be implemented, thereby greatly expanding the application scenario of the NVMe protocol, and exploiting the high concurrency advantage of the NVMe.

In addition to the foregoing localization application of the NVMe protocol, there are some methods in which the NVMe protocol is attached on another networked protocol to implement the NVMe over fabrics. For example, the NVMe protocol is attached on an RDMA protocol to implement the NOF. In this case, a terminal and a server in the localized NVMe protocol respectively serve as a terminal and a server in the NOF. Data may be transmitted between the terminal and the server by using the RDMA protocol. According to the NVMe standard protocol, in an implementation of the NOF, the SQ and the CQ in the NVMe protocol are set in the terminal, or the SQ and the CQ may be set in the server. The following separately provides descriptions.

1. The SQ and the CQ are set in the terminal.

Figure 1B:
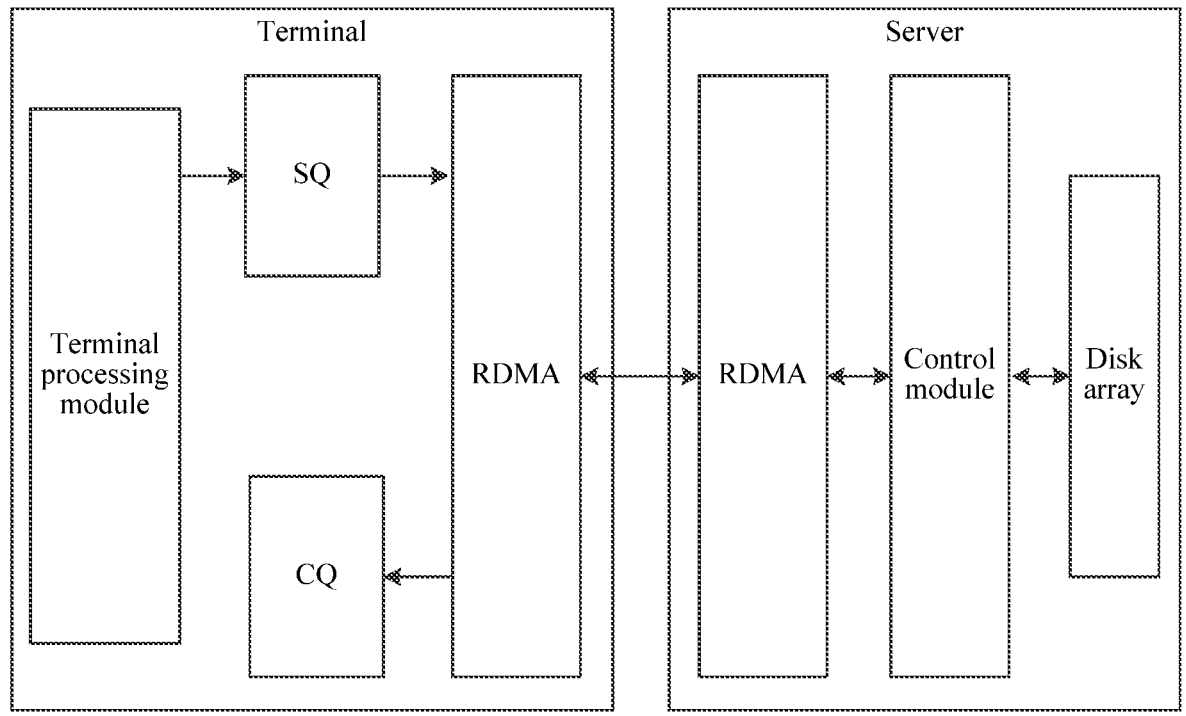
FIG. 1b is a schematic structural diagram of existing NVMe over fabrics.

Referring to FIG. 1b, FIG. 1b, is a schematic structural diagram of NOF in the prior art. The terminal includes a terminal processing module, an RDMA module, the SQ, and the CQ. The server includes an RDMA module, a control module, and a disk array. All operations, such as a read operation and a write operation, for the disk array are completed by the control module. In this setting manner, a procedure in which the terminal reads data from the server may include the following steps.

Step a. The terminal constructs an NVMe write instruction in an SQE in a memory of the terminal by using the terminal processing module, where the SQE is actually an NVMe instruction, and writes the SQE write instruction into the SQ.

Step b. When finding that the SQ in the NVMe has the SQE, the RDMA module of the terminal sends a notification message to the RDMA module of the server, so that the server learns that the SQE needs to be processed.

Step c. After receiving the notification message, the server initiates an RDMA read operation by using the RDMA module of the server, to read the SQE from the terminal.

Step d. The terminal returns the SQE to the server by using the RDMA.

Step e. After receiving the SQE, the server identifies the SQE to find that the NVMe write instruction is constructed in the SQE, the control module of the server reads data from the disk array by using the NVMe write instruction, and the RDMA module of the server executes an RDMA write operation to write the extracted data into the terminal.

Step f. After completing the operation of writing the data into the terminal, the server generates a CQE, where the CQE indicates that processing of the SQE has been completed, and sends the CQE to the terminal by using an RDMA send operation.

Step g. After receiving the CQE, the RDMA module of the terminal writes the CQE into the CQ in the terminal.

The first four steps in a procedure of writing the data into the server by the terminal are the same, except that an NVMe read instruction is constructed in the SQE in step a. In this case, step e to step g change to the following: Step e. After receiving the SQE, the server identifies the SQE to find that the NVMe read instruction is constructed in the SQE, and the RDMA module of the server initiates an RDMA read operation to the terminal.

Step f. The terminal returns to-be-written data to the server by using the RDMA, and the control module of the server writes the data into the disk array.

Step g. After completing the operation of writing the data into the disk array, the server generates a CQE, where the CQE indicates that processing of the SQE has been completed, and sends the CQE to the terminal by using an RDMA send operation.

Step h. The terminal writes the CQE into the CQ in the terminal.

It may be understood that, because the CQ and the SQ are both set in the terminal, for both the NVMe write operation and read operation, multiple message interactions need to be performed with the server. A message interaction is sending a message from the terminal to the server once or sending a message from the server to the terminal once. For example, the terminal sends a notification message, or the terminal sends an SQE. Execution of the NVMe read operation or write operation requires multiple message interactions. After the read operation or the write operation is completed, the server sends a CQE to the terminal, to complete an execution procedure of an NVMe instruction. It can be seen that, in addition to a quantity of message interactions required by executing the NVMe read operation or write operation, an NVMe operation completed in the manner of setting both the CQ and the SQ in the terminal further requires four message interactions. A quantity of information interactions is large, causing relatively poor NOF performance.

2. The SQ and the CQ are set in the server.

Figure 1C:
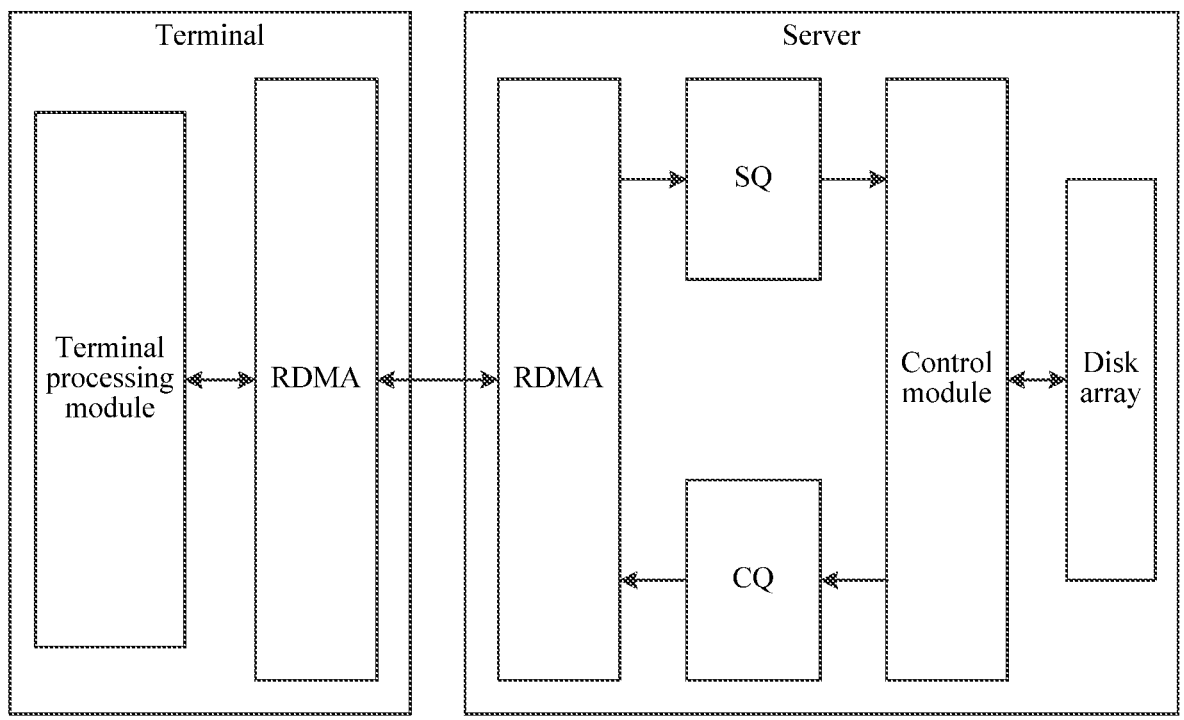
FIG. 1c is another schematic structural diagram of existing NVMe over fabrics.

Referring to FIG. 1c, FIG. 1c is another schematic structural diagram of NOF in the prior art. The terminal includes a terminal processing module and an RDMA module. The server includes an RDMA module, a control module, the SQ, the CQ, and a disk array. All operations, such as a read operation and a write operation, for the disk array are completed by the control module. In this setting manner, a procedure in which the terminal reads data from the server may include the following steps.

Step a. The terminal constructs an NVMe write instruction in an SQE in a memory of the terminal by using the terminal processing module, where the SQE is actually an NVMe instruction.

Step b. The terminal sends the SQE to the server by executing an RDMA send operation by using the RDMA module of the terminal.

Step c. After receiving the SQE, the server writes the SQE into the SQ in the server.

Step d. After extracting the SQE from the SQ, the server identifies the SQE to find that the NVMe write instruction is constructed in the SQE, the control module of the server reads data from the disk array by using the NVMe write instruction, and the RDMA module of the server executes an RDMA write operation to write the extracted data into the terminal.

Step e. After completing the operation of writing the data into the terminal, the server generates a CQE, where the CQE indicates that processing of the SQE has been completed, and writes the CQE into the CQ in the terminal.

Step f. The RDMA module of the server extracts the CQE from the CQ, and sends the CQE to the terminal by using an RDMA send operation.

Step g. After receiving the CQE, the RDMA module of the terminal sends a completion message to the terminal processing module of the terminal, indicating that the NVMe operation has been completed.

The first three steps in a procedure of writing data into the server by the terminal are the same, except that an NVMe read instruction is constructed in the SQE in step a. In this case, step d to step g change to the following: Step d. After receiving the SQE, the server identifies the SQE to find that the NVMe read instruction is constructed in the SQE, and the RDMA module of the server initiates an RDMA read operation to the terminal.

Step e. The terminal returns to-be-written data to the server by using the RDMA, and the control module of the server writes the data into the disk array.

Step f. After completing the operation of writing the data into the disk array, the server generates a CQE, where the CQE indicates that processing of the SQE has been completed, and writes the CQE into the CQ in the terminal.

Step g. The RDMA module of the server extracts the CQE from the CQ, and sends the CQE to the terminal by using an RDMA send operation.

Step h. After receiving the CQE, the RDMA module of the terminal sends a completion message to the terminal processing module of the terminal, indicating that the NVMe operation has been completed.

It may be understood that, because the CQ and the SQ are both set in the server, after being completed, the NVMe write operation or read operation needs to be written into the CQ in the terminal, and the CQE needs to be further sent to the terminal, so that the terminal can learn the message. However, to make the CQE recorded in the terminal, the terminal processing module also needs to establish a queue similar to the CQ in the server to store the CQE, making processing of the CQ quite complex. In addition, when the server sends the CQE to the terminal, the terminal needs to first receive the CQE by using the RDMA module, and then the RDMA module notifies the terminal processing module of the CQE, further aggravating CQ processing complexity.

Embodiment 1

Figure 2:
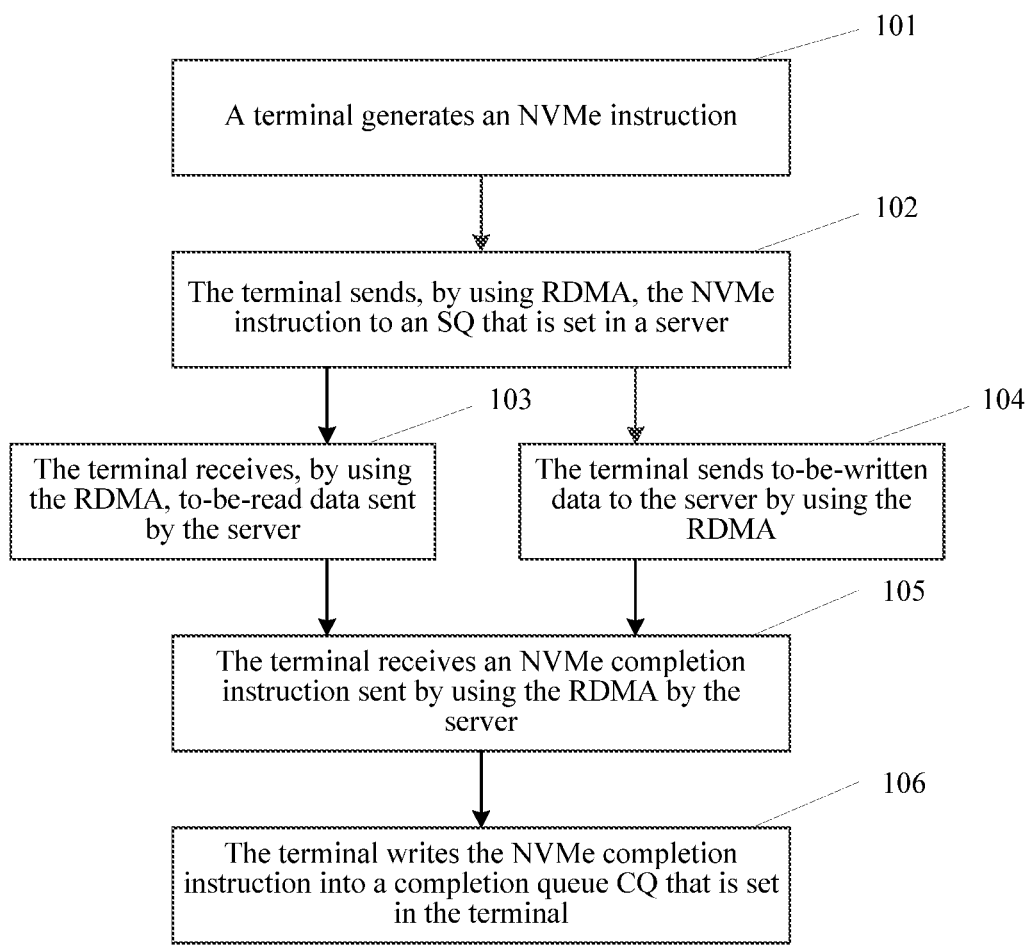
FIG. 2 is an embodiment diagram of a method for implementing NVMe over fabrics according to an embodiment of the present invention.

The following describes an embodiment of the present invention. In this embodiment of the present invention, to resolve the foregoing problem generated because a CQ and an SQ are both set in a terminal or both set in a server, an SQ and a CQ are set separately in a terminal and a server to improve NOF performance. Specifically, for the terminal, FIG. 2 is an embodiment diagram of a method for implementing NVMe over fabrics according to an embodiment of the present invention. As shown in FIG. 2, this embodiment of the present invention provides the method for implementing NVMe over fabrics. The method may include the following content.

101. A terminal generates an NVMe instruction.

The NVMe instruction indicates a data read operation or a data write operation.

It may be understood that, for example, in a normal procedure of executing an NVMe protocol, first, the terminal generates an NVMe instruction, where the NVMe instruction indicates a specific data read operation or data write operation.

102. The terminal sends, by using RDMA, the NVMe instruction to an SQ that is set in a server.

When the NVMe instruction indicates the data read operation, skip to step 103; when the NVMe instruction indicates the data write operation, skip to step 104.

The terminal may send the NVMe instruction to the SQ in the server by using the RDMA. Compared with an existing local transmission manner by using MSI-X, herein, the NVMe instruction can be transmitted by using the RDMA.

It should be noted that, to implement the RDMA, a first RDMA transceiver module may be disposed in the terminal, and a second RDMA transceiver module may be disposed in the server. Information or an instruction that needs to be transmitted between the terminal and the server may be transmitted by using the first RDMA transceiver module and the second RDMA transceiver module, so that the information or instruction that needs to be transmitted can be carried in an RDMA protocol, that is, remote transmission of the information or instruction can be implemented.

Using the NVMe instruction as an example, a send queue and a receive queue are respectively set in the first RDMA transceiver module and the second RDMA transceiver module, and the NVMe instruction is added to the send queue of the first RDMA transceiver module, so that the first RDMA transceiver module may be used to send the information to the receive queue of the second RDMA transceiver module, so as to send the NVMe instruction from the terminal to the server by using the RDMA.

Figure 3:
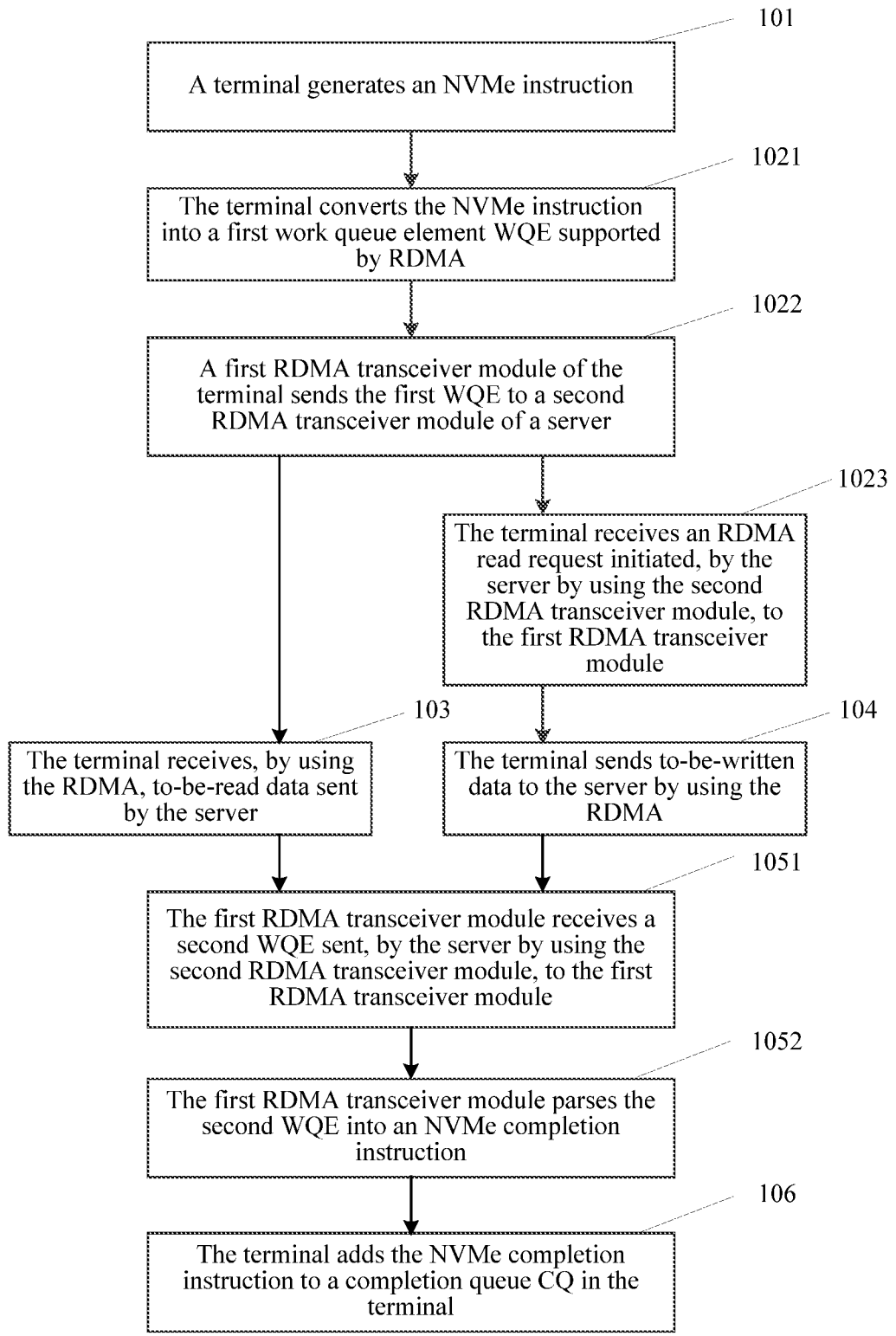
FIG. 3 is another embodiment diagram of a method for implementing NVMe over fabrics according to an embodiment of the present invention.

Optionally, referring to FIG. 3, FIG. 3 is another embodiment diagram of a method for implementing NVMe over fabrics according to an embodiment of the present invention. Step 102 in the embodiment shown in FIG. 2 may specifically include the following steps in FIG. 3.

Step 1021. The terminal converts the NVMe instruction into a first work queue element WQE supported by the RDMA.

It may be understood that, because a manner of carrying information in the RDMA protocol is different from a manner of transmitting information by using an NVMe, if the NVMe instruction needs to be carried in the RDMA for transmission, the NVMe instruction needs to be converted first. For example, herein, the NVMe instruction is converted into the first WQE supported by the RDMA, so that the first WQE is carried in the RDMA protocol for transmission.

Step 1022. A first RDMA transceiver module of the terminal sends the first WQE to a second RDMA transceiver module of the server.

After the NVMe instruction is converted into the first WQE supported by the RDMA, the first WQE is added to the send queue of the first RDMA transceiver module, so that the second RDMA transceiver module receives the first WQE, parses the first WQE into the NVMe instruction, and writes the NVMe instruction into the SQ.

It may be understood that, the first RDMA transceiver module converts the NVMe instruction generated by the terminal into the first WQE supported by the RDMA, and the first WQE is sent to the receive queue of the second RDMA transceiver module by using the send queue of the first RDMA transceiver module, so that the second RDMA transceiver module receives the first WQE, parses the first WQE into the NVMe instruction, and writes the NVMe instruction into the SQ, so that mutual conversion can be implemented between the NVMe instruction and the first WQE supported by the RDMA, thereby eliminating a limitation between the NVMe protocol and the RDMA protocol. Therefore, the NVMe protocol and the RDMA protocol can be combined, to further increase a storage distance of the NVMe protocol and implement NVMe protocol over fabrics.

103. The terminal receives, by using the RDMA, to-be-read data sent by the server.

When the NVMe instruction indicates the data read operation, the terminal can receive, by using the RDMA, the to-be-read data sent by the server.

It may be understood that, when the NVMe instruction indicates the data read operation, that is, the terminal intends to read data from a storage device (such as an SSD) controlled by the server, after receiving the NVMe instruction, the SQ in the server executes the NVMe instruction, extracts the to-be-read data indicated by the NVMe instruction from the SSD, and sends the to-be-read data to the terminal by using the RDMA, so that the terminal can receive, by using the RDMA, the to-be-read data indicated by the NVMe instruction.

104. The terminal sends to-be-written data to the server by using the RDMA.

When the NVMe instruction indicates the data write operation, the terminal can send the to-be-written data to the server by using the RDMA.

It may be understood that, when the NVMe instruction indicates the data write operation, it indicates that the terminal intends to write data into the SSD of the server. After receiving the NVMe instruction, the SQ in the server executes the NVMe instruction, and requires the terminal to write the to-be-written data, and the terminal sends the to-be-written data to the server by using the RDMA, so that the server stores the to-be-written data into the SSD.

Optionally, when the NVMe instruction indicates the data write operation, referring to FIG. 3, before step 104 in the embodiment shown in FIG. 2, the method in FIG. 3 may further include the following step:

1023. The terminal receives an RDMA read request initiated, by the server by using the second RDMA transceiver module, to the first RDMA transceiver module.

When learning that the NVMe instruction indicates the data write operation, the server initiates the RDMA read operation to the first RDMA transceiver module by using the second RDMA transceiver module. In this case, the terminal can receive the RDMA read request initiated, by the server by using the second RDMA transceiver module, to the first RDMA transceiver module.

It may be understood that, if the terminal initiates the data write operation, the terminal needs to receive an instruction of the server before performing a subsequent step of sending the to-be-written data by using the RDMA. The instruction can inform the terminal of a time for sending the to-be-written data. Therefore, when determining that the NVMe instruction is the data write operation, the server initiates the RDMA read operation to the first RDMA transceiver module by using the second RDMA transceiver module, and after receiving the RDMA read operation, the terminal sends the to-be-written data to the server by using the RDMA.

Therefore, it can be seen that, the manner in which the terminal receives the RDMA read request initiated, by the server by using the second RDMA transceiver module, to the first RDMA transceiver module enables the server to quickly obtain the to-be-written data, so as to complete step 104, so that scalability of the solution of this embodiment of the present invention can be improved.

105. The terminal receives an NVMe completion instruction sent by using the RDMA by the server.

After sending the NVMe instruction by using the RDMA, the terminal receives the NVMe completion instruction sent by using the RDMA by the server.

It may be understood that, after step 103 or step 104 is completed, that is, after the data read operation or data write operation corresponding to the NVMe instruction is completed, after step 103 or step 104 is completed, the server generates the NVMe completion instruction, and sends the NVMe completion instruction to the terminal, so that the terminal can receive the NVMe completion instruction by using the RDMA.

Optionally, referring to FIG. 3, step 105 in the embodiment shown in FIG. 2 may specifically include the following steps in FIG. 3.

1051. The first RDMA transceiver module receives a second WQE sent, by the server by using the second RDMA transceiver module, to the first RDMA transceiver module.

1052. The first RDMA transceiver module parses the second WQE into the NVMe completion instruction.

It may be understood that, step 1051 and step 1052 are similar to step 1021 and step 1022. When the terminal receives the NVMe completion instruction sent by the server, the NVMe completion instruction is not received directly. Instead, the first RDMA transceiver module first receives the second WQE, where the second WQE is obtained by the second RDMA transceiver module by converting the NVMe completion instruction.

106. The terminal writes the NVMe completion instruction into a CQ in the terminal.

After receiving the NVMe completion instruction, the terminal writes the NVMe completion instruction into the CQ in the terminal.

Therefore, it can be seen that, the CQ in the NVMe is set in a terminal, the SQ in the NVMe is set in the server, the terminal communicates with the server by using the RDMA, that is, the NVMe instruction generated by the terminal is sent to the SQ in the server by the terminal by using the RDMA, and corresponding operations may be executed according to different NVMe instructions. If the NVMe instruction indicates the data read operation, the terminal receives, by using the RDMA, the to-be-read data sent by the server. If the NVMe instruction indicates the data write operation, the terminal sends the to-be-written data to the server by using the RDMA. Then, the terminal receives, by using the RDMA, the NVMe completion instruction sent by the server, and writes the NVMe completion instruction into the CQ in the terminal. Writing the NVMe completion instruction into the CQ indicates that one data read operation or data write operation has been completed. In the solution of this embodiment of the present invention, the RDMA and the NVMe are combined, the CQ in the NVMe is set in the terminal, and the SQ in the NVMe is set in the server, so that a quantity of interactions between the terminal and the server in one NVMe operation can be decreased and CQ processing complexity can be reduced, thereby improving NOF performance.

Embodiment 2

Figure 4:
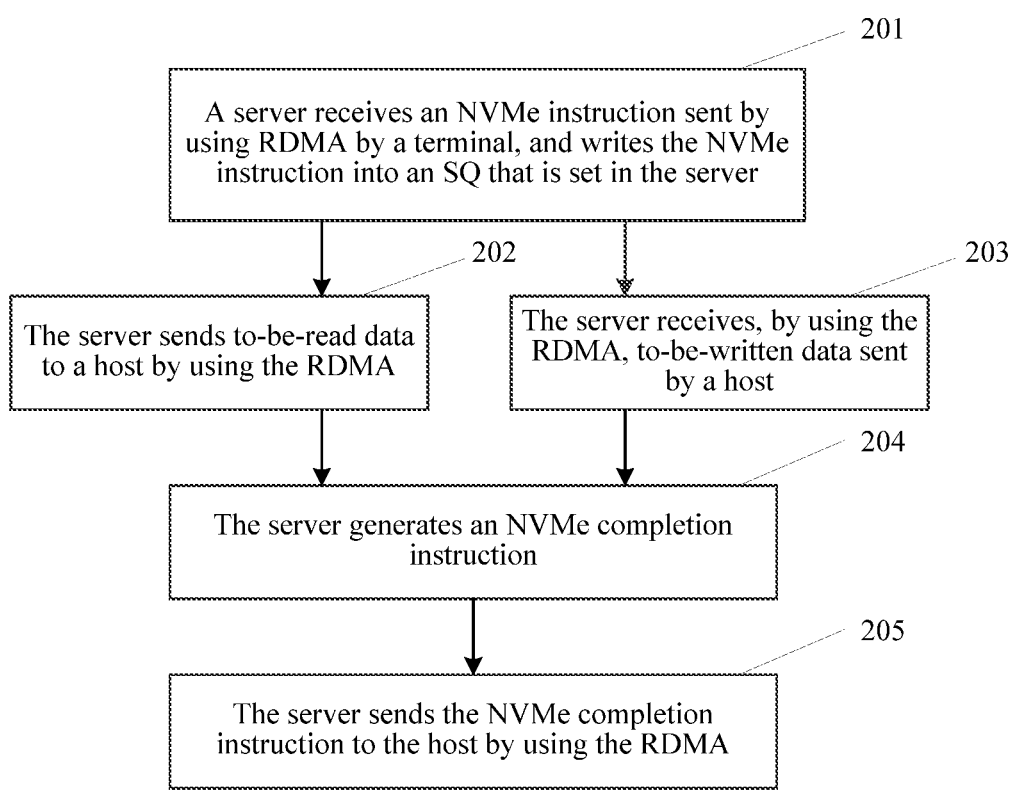
FIG. 4 is an embodiment diagram of a method for implementing NVMe over fabrics according to an embodiment of the present invention.

The foregoing describes, from a perspective of a terminal, an embodiment of a method for implementing NVMe over fabrics according to an embodiment of the present invention. The following describes, from a perspective of a server, a method for implementing NVMe over fabrics according to an embodiment of the present invention. Embodiment 1 may be combined with Embodiment 2 to form an NVMe over fabrics system. For the server, FIG. 4 is an embodiment diagram of a method for implementing NVMe over fabrics according to an embodiment of the present invention. As shown in FIG. 4, this embodiment of the present invention provides the method for implementing NVMe over fabrics. The method may include the following steps.

201. A server receives an NVMe instruction sent by using RDMA by a terminal, and writes the NVMe instruction into an SQ that is set in the server, where the NVMe instruction indicates a data read operation or a data write operation.

Figure 5:
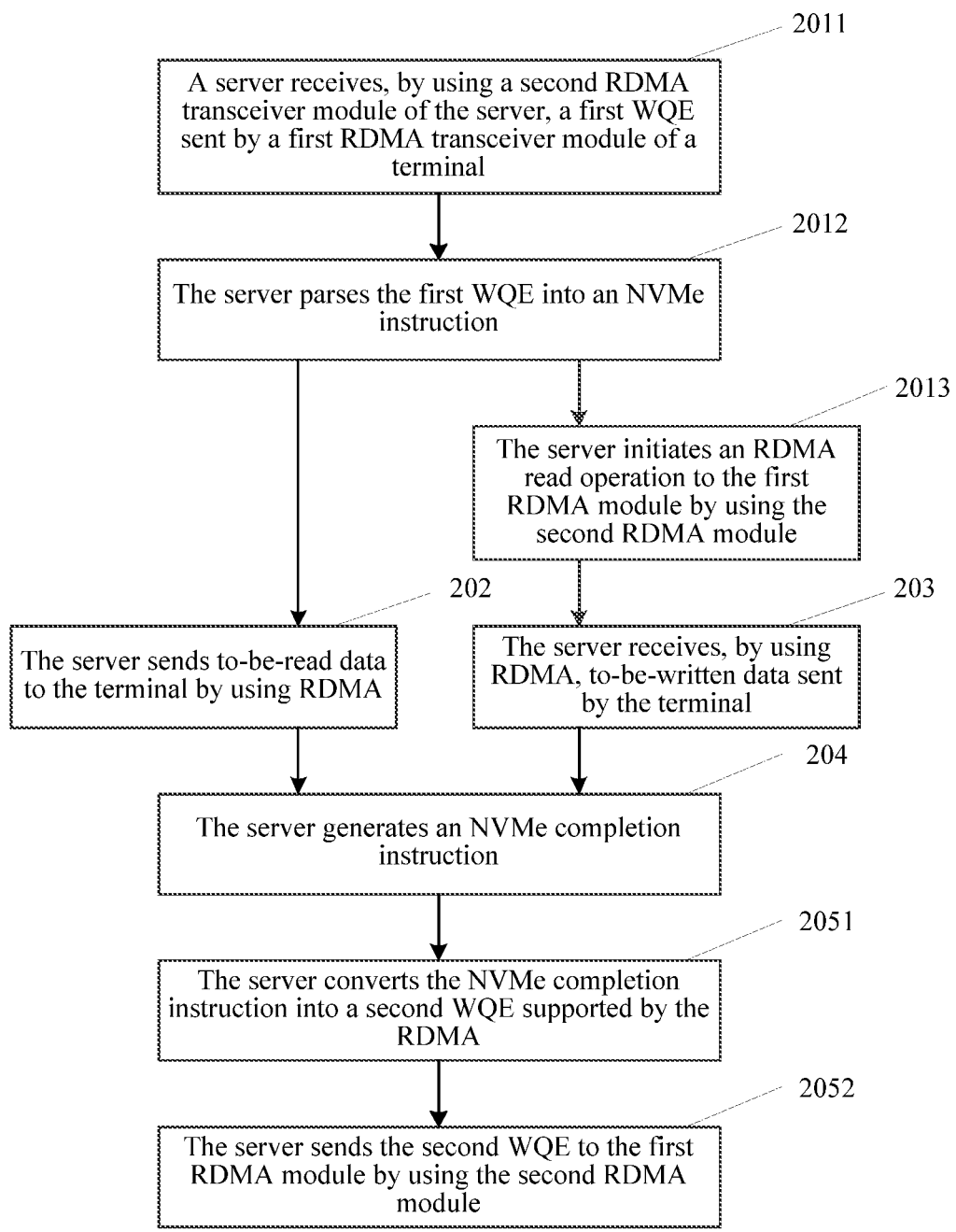
FIG. 5 is another embodiment diagram of a method for implementing NVMe over fabrics according to an embodiment of the present invention.

Optionally, referring to FIG. 5, FIG. 5 is another embodiment diagram of a method for implementing NVMe over fabrics according to an embodiment of the present invention. Step 201 in the embodiment shown in FIG. 4 may specifically include the following steps in FIG. 5.

2011. The server receives, by using a second RDMA transceiver module of the server, a first WQE sent by a first RDMA transceiver module of the terminal.

It may be understood that, because a manner of carrying information in an RDMA protocol is different from a manner of transmitting information by using an NVMe, if the NVMe instruction needs to be carried in the RDMA for transmission, the NVMe instruction needs to be converted first. For example, herein, the NVMe instruction is converted into the first WQE supported by the RDMA, so that the first WQE is carried in the RDMA protocol for transmission. For example, the second RDMA transceiver module is disposed in the server, the first RDMA transceiver module is disposed in the terminal, and the first RDMA transceiver module communicates with the second RDMA transceiver module by using the RDMA.

2012. The server parses the first WQE into the NVMe instruction.

After receiving the first WQE, the second RDMA transceiver module of the server parses the first WQE into the NVMe instruction, so that the server parses the NVMe instruction.

It may be understood that, the second RDMA transceiver module is disposed in the server, the first RDMA transceiver module is disposed in the terminal, and the first RDMA transceiver module communicates with the second RDMA transceiver module by means of the RDMA, so that mutual conversion can be implemented between the NVMe instruction and the first WQE supported by the RDMA, thereby eliminating a limitation between an NVMe protocol and the RDMA protocol. Therefore, the NVMe protocol and the RDMA protocol can be combined, to further increase a storage distance of the NVMe protocol and implement NVMe protocol over fabrics.

When the NVMe instruction indicates the data read operation, skip to step 202. When the NVMe instruction indicates the data write operation, skip to step 203.

202. The server sends to-be-read data to the terminal by using the RDMA.

When the NVMe instruction indicates the data read operation, the server sends the to-be-read data to the terminal by using the RDMA.

It may be understood that, when the NVMe instruction indicates the data read operation, it indicates that the terminal intends to read data from a storage device (such as an SSD) controlled by the server, and after receiving the NVMe instruction, the SQ in the server executes the NVMe instruction, extracts the to-be-read data indicated by the NVMe instruction from the SSD, and sends the to-be-read data to the terminal by using the RDMA.

It should be noted that, for an implementation of the RDMA, reference may be made to supplementary descriptions of step 102 in the embodiment shown in FIG. 1. Details are not described herein again.

203. The server receives, by using the RDMA, to-be-written data sent by the terminal.

When the NVMe instruction indicates the data write operation, the server receives, by using the RDMA, the to-be-written data sent by the terminal.

It may be understood that, when the NVMe instruction indicates the data write operation, it indicates that the terminal intends to write data into the SSD of the server. After receiving the NVMe instruction, the SQ in the server executes the NVMe instruction, and requires the terminal to write the to-be-written data, and the terminal sends the to-be-written data to the server by using the RDMA, so that the server receives, by using the RDMA, the to-be-written data sent by the terminal, so as to store the received to-be-written data into the SSD.

Optionally, when the NVMe instruction indicates the data write operation, referring to FIG. 5, before step 203 in FIG. 5, the method may further include the following step:

2013. The server initiates an RDMA read operation to the first RDMA transceiver module by using the second RDMA transceiver module.

When the server learns that the NVMe instruction indicates the data write operation, to enable the terminal to know a time for writing the to-be-written data, the server initiates the RDMA read operation to the first RDMA transceiver module by using the second RDMA transceiver module, so that the terminal can write the to-be-written data according to the RDMA read operation.

It may be understood that, to enable the terminal to easily know that the server has prepared to accept writing, by the terminal, the to-be-written data, the second RDMA module initiates the RDMA read operation to the first RDMA module to instruct the terminal, thereby enhancing implementability of the solution of this embodiment of the present invention.

204. The server generates an NVMe completion instruction.

After completing the operation indicated by the NVMe instruction, the server generates the NVMe completion instruction.

It may be understood that, after step 103 or step 104 is completed, that is, after the data read operation or data write operation corresponding to the NVMe instruction is completed, after step 103 or step 104 is completed, the server generates the NVMe completion instruction, and sends the NVMe completion instruction to the terminal, so that the terminal can receive the NVMe completion instruction by using the RDMA.

205. The server sends the NVMe completion instruction to the terminal by using the RDMA.

After generating the NVMe completion instruction, the server sends the NVMe completion instruction to the terminal by using the RDMA, so that the terminal knows that the server has completed the NVMe instruction sent by the terminal.

Optionally, referring to FIG. 5, step 205 in the embodiment shown in FIG. 4 may specifically include the following steps in FIG. 5.

2051. The server converts the NVMe completion instruction into a second WQE supported by the RDMA.

2052. The server sends the second WQE to the first RDMA module by using the second RDMA module.

It may be understood that, step 2051 and step 2052 are similar to step 2011 and step 2012. When the server sends the NVMe completion instruction to the terminal, the NVMe completion instruction is not sent directly. Instead, the second RDMA transceiver module first converts the NVMe completion instruction into the second WQE, and then the second RDMA transceiver module sends the second WQE to the first RDMA transceiver module, that is, to the terminal.

Therefore, it can be seen that, the server receives the NVMe instruction sent, by the terminal by using the RDMA, to the SQ in the server, and may execute corresponding operations according to different NVMe instructions. If the NVMe instruction indicates the data read operation, the server sends the to-be-read data to the terminal by using the RDMA. If the NVMe instruction indicates the data write operation, the server receives, by using the RDMA, the to-be-written data sent by the terminal. Then, the server generates the NVMe completion instruction, and sends the NVMe completion instruction to the terminal by using the RDMA. In the solution of this embodiment of the present invention, the RDMA and an NVMe are combined, the CQ in the NVMe is set in the terminal, the SQ in the NVMe is set in the server, and the terminal communicates with the server by using the RDMA, so that a quantity of interactions between the terminal and the server in one NVMe operation can be decreased and CQ processing complexity can be reduced, thereby improving NOF performance Embodiment 3

The foregoing separately describes a terminal and a server in the method of the embodiments of the present invention. The following describes an NVMe over fabrics system including the terminal and the server in the embodiments of the present invention. The system includes a data read procedure and a data write procedure. The following describes the system with reference to the data read procedure.

The system may include: a terminal, configured to generate a non-volatile memory express NVMe instruction, where the NVMe instruction indicates a data read operation or a data write operation, where the terminal is further configured to send, by using remote direct memory access RDMA, the NVMe instruction to a submission queue SQ that is set in a server; and the server, configured to read the NVMe instruction from the SQ.

When the NVMe instruction indicates the data read operation, the server sends to-be-read data to the terminal by using the RDMA; or when the NVMe instruction indicates the data write operation, the terminal sends to-be-written data to the server by using the RDMA.

The server is further configured to receive the to-be-written data.

When the server completes the data read operation or the data write operation indicated by the NVMe instruction, the server is further configured to generate an NVMe completion instruction; and the server is further configured to send, by using the RDMA, the NVMe completion instruction to a completion queue CQ that is set in the terminal.

Optionally, when the NVMe instruction indicates the data write operation, that the terminal sends to-be-written data to the server by using the RDMA includes: when the NVMe instruction indicates the data write operation, initiating, by the server, an RDMA read request to the terminal; receiving, by the terminal, the RDMA read request; and sending, by the terminal by using the RDMA, the to-be-written data to the server according to the RDMA read request.

The following separately describes the data read procedure and the data write procedure of the system.

Figure 6:
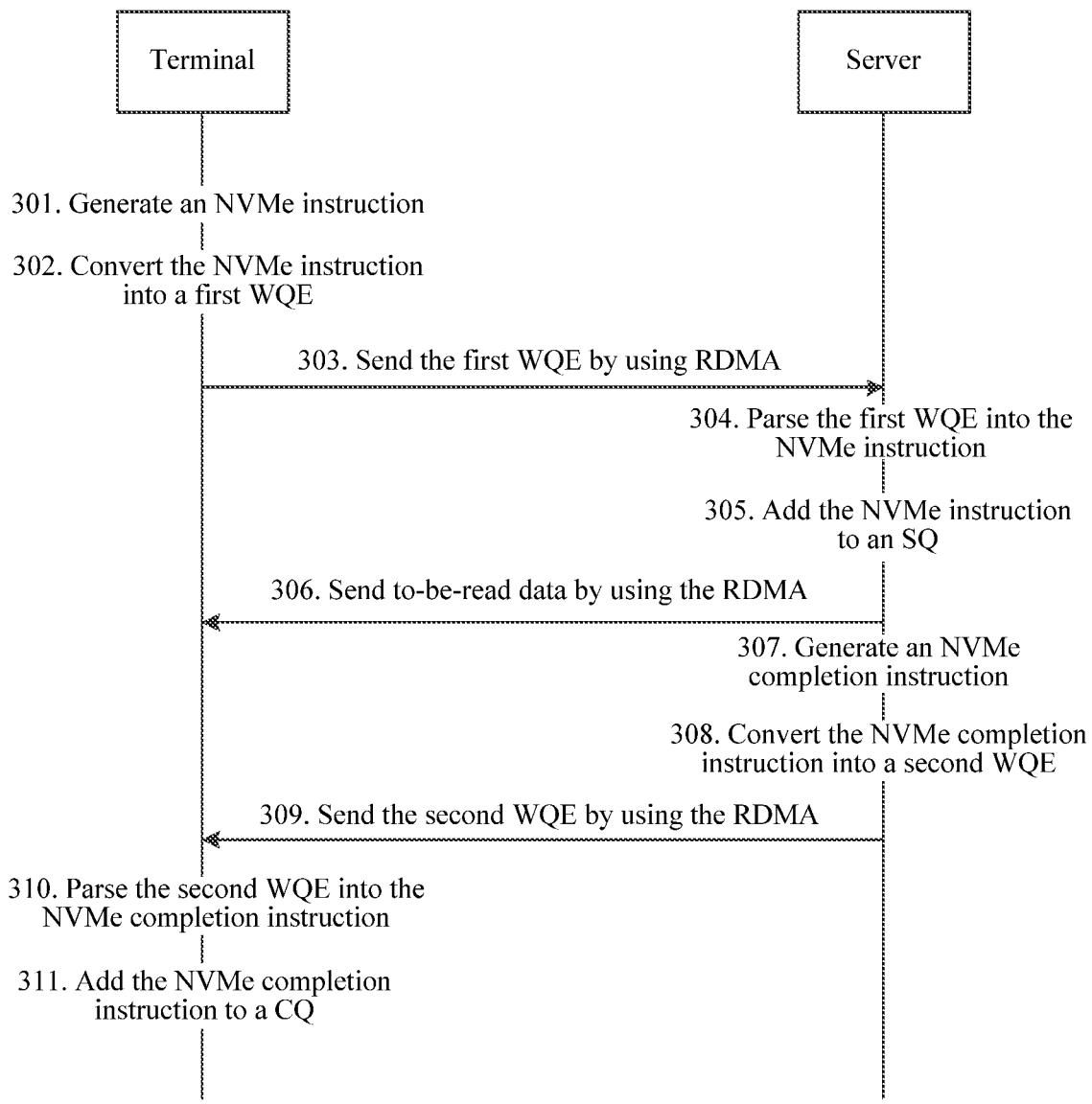
FIG. 6 is an embodiment diagram of an NVMe over fabrics system according to an embodiment of the present invention.

1. For the data read procedure of the system, referring to FIG. 6, FIG. 6 is an embodiment diagram of an NVMe over fabrics system according to an embodiment of the present invention.

Step 301. Generate an NVMe instruction.

The NVMe instruction is generated by the terminal. For example, in a normal procedure of executing an NVMe protocol, first, the terminal generates an NVMe instruction, where the NVMe instruction indicates a specific data read operation or data write operation.

Step 302. Convert the NVMe instruction into a first WQE.

To enable the NVMe instruction to be transmitted in RDMA, the terminal converts the NVMe instruction into the first WQE. Because a manner of carrying information in an RDMA protocol is different from a manner of transmitting information by using an NVMe, if the NVMe instruction needs to be carried in the RDMA for transmission, the NVMe instruction needs to be converted first. For example, herein, the NVMe instruction is converted into the first WQE supported by the RDMA, so that the first WQE is carried in the RDMA protocol for transmission.

Step 303. Send the first WQE by using RDMA.

After the NVMe instruction is converted into the first WQE supported by the RDMA, the first WQE is added to a send queue of a first RDMA transceiver module.

Step 304. Parse the first WQE into the NVMe instruction.

After receiving the first WQE, a second RDMA transceiver module of the server parses the first WQE into the NVMe instruction, so that the server parses the NVMe instruction.

Step 305. Write the NVMe instruction to an SQ.

After obtaining the NVMe instruction, the server writes the NVMe instruction into the SQ, and then the server reads the NVMe instruction from the SQ, and executes the instruction.

It should be noted that, an execution procedure of the instruction may be executed according to an SQ queue, that is, executed according to a first-in first-out sequence. Certainly, another execution manner may also be used. Specifically, it is determined according to a data requirement of the system. This is not limited herein.

Step 306. Send to-be-read data by using the RDMA.

When learning the data read operation indicated by the NVMe instruction, the server sends the to-be-read data by using the RDMA.

It may be understood that, when the NVMe instruction indicates the data read operation, it indicates that the terminal intends to read data from a storage device (such as an SSD) controlled by the server, and after receiving the NVMe instruction, the SQ in the server executes the NVMe instruction, extracts the to-be-read data indicated by the NVMe instruction from the SSD, and sends the to-be-read data to the terminal by using the RDMA.

Step 307. Generate an NVMe completion instruction.

After the server sends the to-be-read data, it indicates that execution of the NVMe instruction has been completed, and the server generates the NVMe completion instruction.

Step 308. Convert the NVMe completion instruction into a second WQE.

The server converts the NVMe completion instruction into the second WQE, so that the second WQE is sent by using the RDMA.

It may be understood that, when the server sends the NVMe completion instruction to the terminal, the NVMe completion instruction is not sent directly. Instead, the second RDMA transceiver module first converts the NVMe completion instruction into the second WQE, and then the second RDMA transceiver module sends the second WQE to the first RDMA transceiver module, that is, to the terminal.

Step 309. Send the second WQE by using the RDMA.

After obtaining the second WQE by means of conversion, the server sends the second WQE to the terminal by using the RDMA.

Step 310. Parse the second WQE into the NVMe completion instruction.

After receiving the second WQE, the terminal first parses the second WQE into the NVMe completion instruction.

It may be understood that, when the terminal receives the NVMe completion instruction sent by the server, the NVMe completion instruction is not received directly. Instead, the first RDMA transceiver module first receives the second WQE, where the second WQE is obtained by the second RDMA transceiver module by converting the NVMe completion instruction.

Step 311. Write the NVMe completion instruction into a CQ.

After parsing the NVMe completion instruction, the terminal writes the NVMe completion instruction into the CQ, indicating that the NVMe instruction sent in step 301 has been completed.

Figure 7:
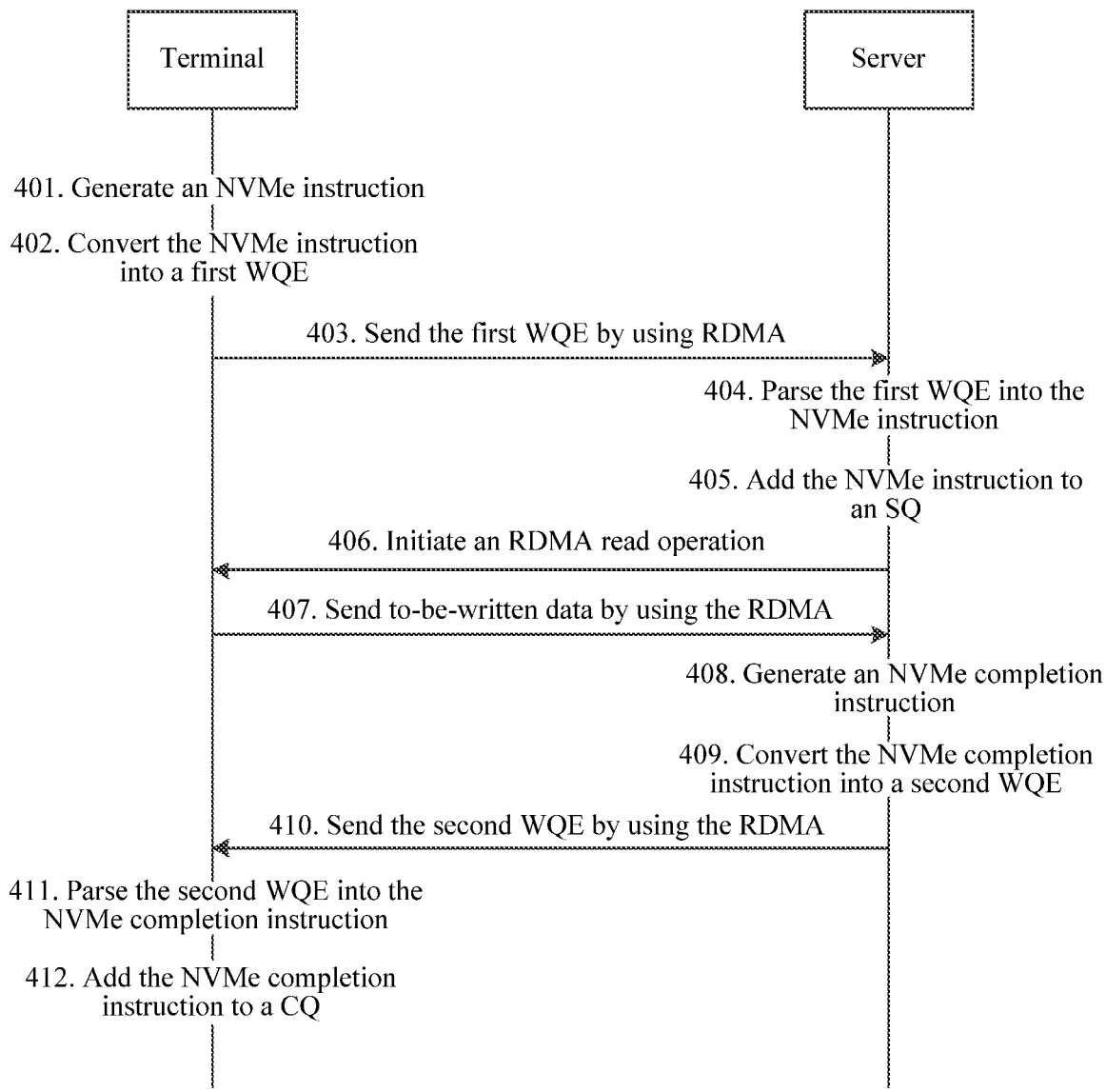
FIG. 7 is another embodiment diagram of an NVMe over fabrics system according to an embodiment of the present invention.

2. For the data write procedure of the system, referring to FIG. 7, FIG. 7 is another embodiment diagram of an NVMe over fabrics system according to an embodiment of the present invention. Step 401 to step 405 are similar to step 301 to step 305 in the embodiment shown in FIG. 6, and step 408 to step 412 are similar to step 307 to step 311 in the embodiment shown in FIG. 6. Details are not described herein again. The embodiment shown in FIG. 7 further includes the following steps.

Step 406. Initiate an RDMA read operation.

When learning the indicated data write operation in the NVMe instruction read from the SQ, the server initiates a read operation to the terminal by using the RDMA, thereby informing the terminal of a manner and a time for writing data.

It may be understood that, if the terminal sends the data write operation, the terminal needs to receive an instruction of the server before performing a subsequent step of sending the to-be-written data by using the RDMA. The instruction can inform the terminal of a time for sending the to-be-written data. Therefore, when determining that the NVMe instruction is the data write operation, the server initiates the RDMA read operation to the first RDMA transceiver module by using the second RDMA transceiver module, and after receiving the RDMA read operation, the terminal sends the to-be-written data to the server by using the RDMA.

Step 407. Send to-be-written data by using the RDMA.

After receiving the read operation initiated by using the RDMA by the server, the terminal sends the to-be-written data by using the RDMA, so that the server can write the to-be-written data into a corresponding position in the SSD.

It may be understood that, when the NVMe instruction indicates the data write operation, it indicates that the terminal intends to write data into the SSD of the server. After receiving the NVMe instruction, the SQ in the server executes the NVMe instruction, and requires the terminal to write the to-be-written data, and the terminal sends the to-be-written data to the server by using the RDMA, so that the server receives, by using the RDMA, the to-be-written data sent by the terminal, so as to store the received to-be-written data into the SSD.

Embodiment 4

Figure 8:
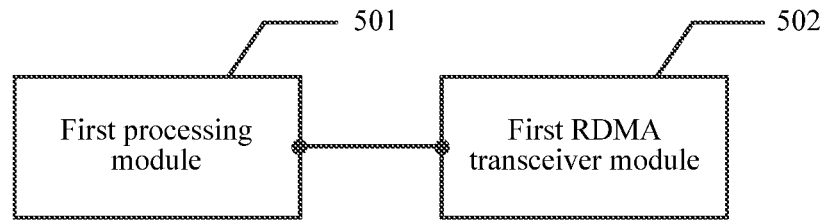
FIG. 8 is an embodiment diagram of a server according to an embodiment of the present invention.

The foregoing describes the NVMe over fabrics system of the embodiments of the present invention. The following describes a server of the embodiments of the present invention. FIG. 8 is an embodiment diagram of a server according to an embodiment of the present invention. As shown in FIG. 8, this embodiment of the present invention provides a server. The server serves as a terminal and may include: a first processing module 501, configured to generate an NVMe instruction, where the NVMe instruction indicates a data read operation or a data write operation; and a first RDMA transceiver module 502, configured to send, by using RDMA, the NVMe instruction to an SQ that is set in a server, where the first RDMA transceiver module 502 is further configured to: when the NVMe instruction indicates the data read operation, receive, by using the RDMA, to-be-read data sent by the server; or when the NVMe instruction indicates the data write operation, send to-be-written data to the server by using the RDMA; the first RDMA transceiver module 502 is further configured to receive an NVMe completion instruction sent by using the RDMA by the server; and the first processing module 501 is further configured to write the NVMe completion instruction into a CQ that is set in the terminal.

Therefore, it can be seen that, the NVMe instruction generated by the first processing module 501 is sent to the SQ in the server by the first RDMA transceiver module 502 by using the RDMA, and corresponding operations may be executed according to different NVMe instructions. If the NVMe instruction indicates the data read operation, the first RDMA transceiver module 502 receives, by using the RDMA, the to-be-read data sent by the server. If the NVMe instruction indicates the data write operation, the first RDMA transceiver module 502 sends the to-be-written data to the server by using the RDMA. Then, the first RDMA transceiver module 502 receives, by using the RDMA, the NVMe completion instruction sent by the server, and the first processing module 501 writes the NVMe completion instruction into the CQ in the terminal. Writing the NVMe completion instruction into the CQ indicates that one data read operation or data write operation has been completed. In the solution of this embodiment of the present invention, the RDMA and an NVMe are combined, the CQ in the NVMe is set in the terminal, and the SQ in the NVMe is set in the server, so that a quantity of interactions between the terminal and the server in one NVMe operation can be decreased and CQ processing complexity can be reduced, thereby improving NOF performance.

Figure 9:
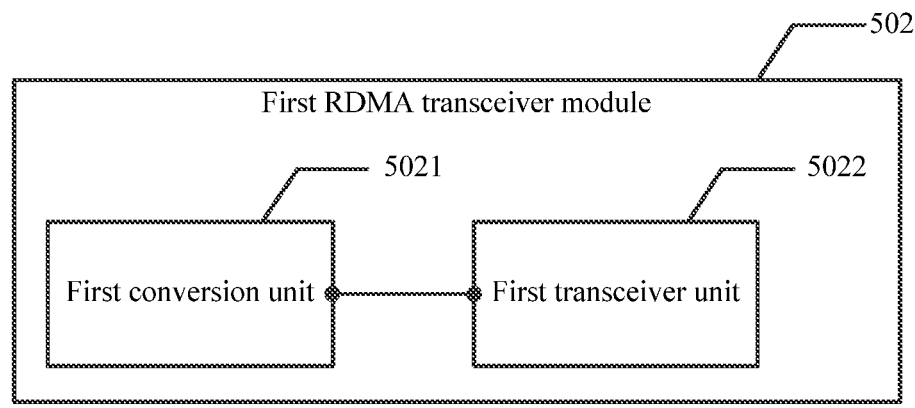
FIG. 9 is an embodiment diagram of a first RDMA transceiver module in a server according to an embodiment of the present invention.

Optionally, referring to FIG. 9, FIG. 9 is an embodiment diagram of a first RDMA transceiver module in a server according to an embodiment of the present invention. The first RDMA transceiver module 502 may include: a first conversion unit 5021, configured to convert the NVMe instruction into a first work queue element WQE supported by the RDMA; and a first transceiver unit 5022, configured to send the first WQE to a second RDMA transceiver module of the server, so that the second RDMA transceiver module parses the first WQE into the NVMe instruction and writes the NVMe instruction into the SQ.

It may be understood that, the first conversion unit 5021 converts the NVMe instruction generated by the first processing module 501 into the first WQE supported by the RDMA, and the first WQE is sent to a receive queue of the second RDMA transceiver module by using a send queue of the first transceiver unit 5022, so that the second RDMA transceiver module receives the first WQE, parses the first WQE into the NVMe instruction, and writes the NVMe instruction into the SQ, that is, mutual conversion can be implemented between the NVMe instruction and the first WQE supported by the RDMA, thereby eliminating a limitation between an NVMe protocol and an RDMA protocol. Therefore, the NVMe protocol and the RDMA protocol can be combined, to further increase a storage distance of the NVMe protocol and implement NVMe protocol over fabrics.

Optionally, the first transceiver unit 5022 is further configured to: receive an RDMA read request initiated, by the server by using the second RDMA transceiver module, to the first RDMA transceiver module.

It may be understood that, if the terminal sends the data write operation, the terminal needs to receive an instruction of the server before performing a subsequent step of sending the to-be-written data by using the RDMA. The instruction can inform the terminal of a time for sending the to-be-written data. Therefore, when determining that the NVMe instruction is the data write operation, the server initiates the RDMA read operation to the first RDMA transceiver module 502 by using the second RDMA transceiver module, and after receiving the RDMA read operation, the first transceiver unit 5022 in the first RDMA transceiver module sends the to-be-written data to the server by using the RDMA.

Optionally, the first transceiver unit 5022 is further configured to: receive a second WQE sent, by the server by using the second RDMA transceiver module, to the first RDMA transceiver module; and the first conversion unit 5021 is further configured to: parse the second WQE into the NVMe completion instruction.

It may be understood that, similar to the foregoing operation for the first WQE, when the first transceiver unit 5022 receives the NVMe completion instruction sent by the server, the NVMe completion instruction is not received directly. Instead, the first transceiver unit 5022 first receives the second WQE, and then the first conversion unit 5021 converts the second WQE into the NVMe completion instruction and stores the NVMe completion instruction.

Optionally, the first transceiver unit 5022 is further specifically configured to: receive the to-be-read data sent by the second RDMA transceiver module.

It may be understood that, the to-be-read data is actually sent by the second RDMA transceiver module of the server, and the first transceiver unit 5022 receives the to-be-read data also by using the RDMA.

Embodiment 5

Figure 10:
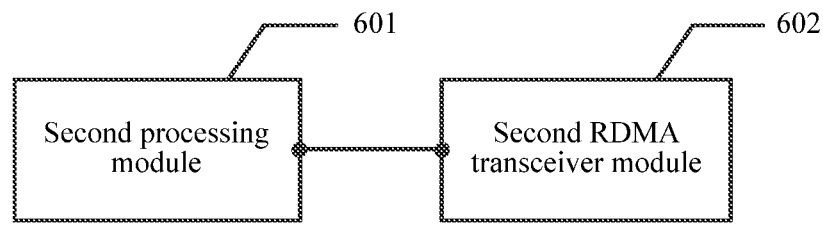
FIG. 10 is an embodiment diagram of a server according to an embodiment of the present invention.

The following describes a server of the embodiments of the present invention. FIG. 10 is an embodiment diagram of a server according to an embodiment of the present invention. As shown in FIG. 10, this embodiment of the present invention provides the server. The server serves as a server and may include: a second RDMA transceiver module 602, configured to: receive an NVMe instruction sent by using RDMA by a terminal, and write the NVMe instruction into an SQ that is set in the server, where the NVMe instruction indicates a data read operation or a data write operation; and a second processing module 601, configured to read the NVMe instruction from the SQ.

The second RDMA transceiver module 602 is further configured to: when the NVMe instruction indicates the data read operation, send to-be-read data to the terminal by using the RDMA; or when the NVMe instruction indicates the data write operation, receive, by using the RDMA, to-be-written data sent by the terminal.

The second processing module 601 is further configured to generate an NVMe completion instruction.

The second RDMA transceiver module 602 is further configured to: send the NVMe completion instruction to the terminal by using the RDMA.

Therefore, it can be seen that, the second RDMA transceiver module 602 receives the NVMe instruction that is in the SQ and that is sent by using the RDMA by the terminal, and may execute corresponding operations according to different NVMe instructions. If the NVMe instruction indicates the data read operation, the second RDMA transceiver module 602 sends the to-be-read data to the terminal by using the RDMA. If the NVMe instruction indicates the data write operation, the second RDMA transceiver module 602 receives, by using the RDMA, the to-be-written data sent by the terminal. Then, the second processing module 601 generates the NVMe completion instruction, and the second RDMA transceiver module 602 sends the NVMe completion instruction to the terminal. In the solution of this embodiment of the present invention, the RDMA and an NVMe are combined, the CQ in the NVMe is set in the terminal, and the SQ in the NVMe is set in the server, so that a quantity of interactions between the terminal and the server in one NVMe operation can be decreased and CQ processing complexity can be reduced, thereby improving NOF performance.

Figure 11:
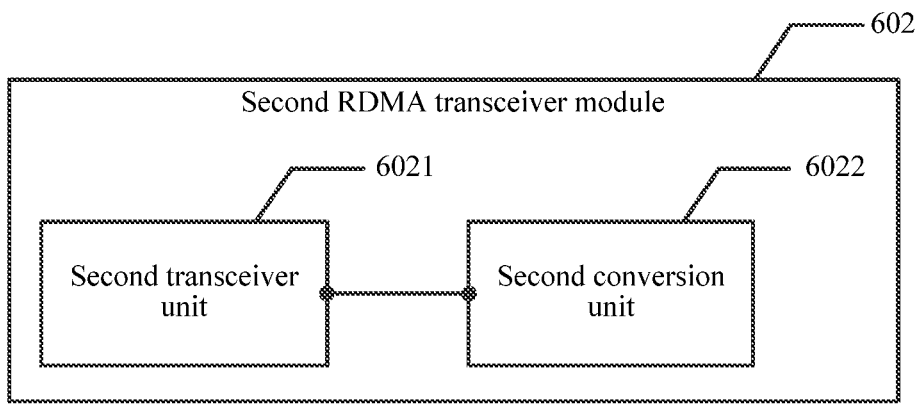
FIG. 11 is an embodiment diagram of a second RDMA transceiver module in a server according to an embodiment of the present invention.

Optionally, referring to FIG. 11, FIG. 11 is an embodiment diagram of a second RDMA transceiver module in a server according to an embodiment of the present invention. The second RDMA transceiver module 602 may include: a second transceiver unit 6021, configured to receive a first WQE sent by a first RDMA transceiver module of the terminal; and a second conversion unit 6022, configured to parse the first WQE into the NVMe instruction.

Likewise, when sending the NVMe completion instruction, optionally, the second conversion unit 6022 is further configured to: convert the NVMe completion instruction into a second WQE supported by the RDMA.

The second transceiver unit 6021 is further configured to: send the second WQE to the first RDMA transceiver module.

It may be understood that, because a manner of carrying information in an RDMA protocol is different from a manner of transmitting information by using the NVMe, if the NVMe instruction needs to be carried in the RDMA for transmission, after the second transceiver unit 6021 receives the first WQE sent by the first RDMA transceiver module of the terminal, the second conversion unit 6022 parses the first WQE into the NVMe instruction, so that the second processing module 601 can identify the NVMe instruction and perform a corresponding operation, and mutual conversion can be implemented between the NVMe instruction and the first WQE supported by the RDMA, thereby eliminating a limitation between the NVMe protocol and the RDMA protocol. Therefore, the NVMe protocol and the RDMA protocol can be combined, to further increase a storage distance of the NVMe protocol and implement NVMe protocol over fabrics.

Optionally, the second transceiver unit 6021 is further specifically configured to: send the to-be-read data to the first RDMA transceiver module.

It may be understood that, when the NVMe instruction indicates the data read operation, it indicates that the terminal intends to read data from a storage device (such as an SSD) controlled by the server, and after receiving the NVMe instruction, the SQ in the server executes the NVMe instruction, extracts the to-be-read data indicated by the NVMe instruction from the SSD, and sends the to-be-read data to the terminal by using the second transceiver unit 6021.

Optionally, the second transceiver unit 6021 is further configured to: initiate an RDMA read operation to the first RDMA transceiver module.

When the server learns that the NVMe instruction indicates the data write operation, to enable the terminal to know a time for writing the to-be-written data, the server initiates the RDMA read operation to the first RDMA transceiver module by using the second transceiver unit 6021, so that the terminal can write the to-be-written data according to the RDMA read operation.

It may be understood that, to enable the terminal to easily know that the server has prepared to receive the to-be-read data written by the terminal, the second RDMA module initiates the RDMA read operation to the first RDMA module to instruct the terminal, thereby enhancing implementability of the solution of this embodiment of the present invention.

It may be clearly understood by persons skilled in the art that, for the purpose of convenient and brief description, for a detailed working procedure of the foregoing system, apparatus, and unit, reference may be made to a corresponding procedure in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Embodiment 6

An NVMe over fabrics system comprises a terminal, configured to generate a non-volatile memory express (NVMe) instruction. Wherein the NVMe instruction indicates a data read operation or a data write operation; and the terminal is further configured to send, by using remote direct memory access (RDMA), the NVMe instruction to a submission queue (SQ) that is set in a server; and the server, configured to read the NVMe instruction from the SQ. Wherein, when the NVMe instruction indicates the data read operation, the server sends a to-be-read data to the terminal by using the RDMA; or when the NVMe instruction indicates the data write operation, the terminal sends to-be-written data to the server by using the RDMA; the server is further configured to receive the to-be-written data. When the server completes the data read operation or the data write operation indicated by the NVMe instruction, the server is further configured to generate an NVMe completion instruction; and, the server is further configured to send, by using the RDMA, the NVMe completion instruction to a completion queue (CQ) that is set in the terminal.

Wherein when the NVMe instruction indicates the data write operation, the terminal may sends to-be-written data to the server by using the RDMA comprises: initiating, by the server, an RDMA read request to the terminal; receiving, by the terminal, the RDMA read request; and, sending, by the terminal by using the RDMA, the to-be-written data to the server according to the RDMA read request.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention

What is claimed is:

1. A method for implementing non-volatile memory express (NVMe) over fabrics, the method comprising:
   generating, by a terminal having a completion queue (CQ) for NVMe stored in the terminal and having no submission queue (SQ) for the NVMe, a NVMe instruction, wherein the NVMe instruction indicates a data read operation or a data write operation, the CQ in the terminal configured according to an NVMe protocol;
   writing, by the terminal using remote direct memory access (RDMA) upon generation of the NVMe instruction, the NVMe instruction into a SQ that is stored in a server, the SQ in the server configured according to the NVMe protocol;
   when the NVMe instruction indicates the data read operation, receiving, by the terminal by using the RDMA, to-be-read data sent by the server; or when the NVMe instruction indicates the data write operation, sending, by the terminal, to-be-written data to the server by using the RDMA;
   receiving, by the terminal, an NVMe completion instruction sent by the server using the RDMA; and
   writing, by the terminal, the NVMe completion instruction into the CQ that is stored in the terminal.

2. The method for implementing NVMe over fabrics according to claim 1, wherein writing the NVMe instruction to the SQ comprises:
   converting, by the terminal, the NVMe instruction into a first work queue element (WQE) supported by the RDMA; and
   sending, by a first RDMA transceiver module of the terminal, the first WQE to a second RDMA transceiver module of the server, so that the second RDMA transceiver module parses the first WQE into the NVMe instruction and writes the NVMe instruction into the SQ in the server.

3. The method for implementing NVMe over fabrics according to claim 2, wherein when the NVMe instruction indicates the data write operation, before sending the to-be-written data, the method further comprises:
   receiving, by the terminal, an RDMA read request initiated, by the server by using the second RDMA transceiver module, to the first RDMA transceiver module.

4. The method for implementing NVMe over fabrics according to claim 2, wherein receiving the NVMe completion instruction comprises:
   receiving, by the first RDMA transceiver module, a second WQE sent, by the server by using the second RDMA transceiver module, to the first RDMA transceiver module; and
   parsing, by the first RDMA transceiver module, the second WQE into the NVMe completion instruction.

5. The method for implementing NVMe over fabrics according to claim 2, wherein when the NVMe instruction indicates the data read operation, receiving the to-be-read data comprises:
   receiving, by the first RDMA transceiver module, the to-be-read data sent by the second RDMA transceiver module.

6. The method for implementing NVMe over fabrics according to claim 1, wherein the method further comprises:
   reading, by the server, the NVMe instruction from the SQ.

7. A method for implementing non-volatile memory express (NVMe) over fabrics, the method comprising:
   receiving, by a server, an NVMe instruction sent by using remote direct memory access (RDMA) by a terminal having no submission queue (SQ) for NVMe, and writing, upon reception of the NVMe instruction, the NVMe instruction into a SQ that is stored in the server and configured according to an NVMe protocol, wherein the NVMe instruction indicates a data read operation or a data write operation;
   reading, by the server, the NVMe instruction from the SQ;
   when the NVMe instruction indicates the data read operation, sending, by the server, a to-be-read data to the terminal by using the RDMA; or when the NVMe instruction indicates the data write operation, receiving, by the server by using the RDMA, to-be-written data sent by the terminal;
   generating, by the server, an NVMe completion instruction; and
   sending, by the server by using the RDMA, the NVMe completion instruction to a completion queue (CQ) that is stored in the terminal for the NVMe, the CQ in the terminal being configured according to the NVMe protocol.

8. The method for implementing NVMe over fabrics according to claim 7, wherein receiving the NVMe instruction comprises:
   receiving, by the server by using a second RDMA transceiver module of the server, a first WQE sent by a first RDMA transceiver module of the terminal; and
   parsing, by the server, the first WQE into the NVMe instruction.

9. The method for implementing NVMe over fabrics according to claim 8, wherein when the NVMe instruction indicates the data read operation, sending the to-be-read data comprises:
   sending, by the server, the to-be-read data to the first RDMA transceiver module by using the second RDMA transceiver module.

10. The method for implementing NVMe over fabrics according to claim 8, wherein when the NVMe instruction indicates the data write operation, before receiving the to-be-written data, the method further comprises:
    initiating, by the server, an RDMA read operation to the first RDMA transceiver module by using the second RDMA transceiver module.

11. The method for implementing NVMe over fabrics according to claim 8, wherein sending the NVMe completion instruction comprises:
    converting, by the server, the NVMe completion instruction into a second WQE supported by the RDMA; and
    sending, by the server, the second WQE to the first RDMA transceiver module by using the second RDMA transceiver module.

12. A terminal comprising:
a processor;
a memory storing a program to be executed in the processor, the program comprising instructions for generating a non-volatile memory express (NVMe) instruction, wherein the NVMe instruction indicates a data read operation or a data write operation; and
a first RDMA transceiver circuit configured to send, by using remote direct memory access (RDMA) upon generation of the NVMe instruction, the NVMe instruction to a submission queue (SQ) that is stored in a server and configured according to an NVMe protocol, with the terminal having a completion queue (CQ) for NVMe that is set in the terminal and having no SQ for the NVMe, the CQ in the terminal configured according to the NVMe protocol, wherein
the first RDMA transceiver circuit is further configured to: when the NVMe instruction indicates the data read operation, receive, by using the RDMA, to-be-read data sent by the server; or when the NVMe instruction indicates the data write operation, send to-be-written data to the server by using the RDMA;
the first RDMA transceiver circuit is further configured to receive an NVMe completion instruction sent by using the RDMA by the server; and
the program comprises further instructions for writing the NVMe completion instruction into the CQ that is set in the terminal.

13. The terminal according to claim 12, wherein the first RDMA transceiver circuit comprises:
a first conversion circuit, configured to convert the NVMe instruction into a first work queue element (WQE) supported by the RDMA; and
a first transceiver circuit, configured to send the first WQE to a second RDMA transceiver circuit of the server, so that the server parses the first WQE into the NVMe instruction and writes the NVMe instruction into the SQ.

14. The terminal according to claim 13, wherein the first transceiver circuit is further configured to:
receive a second WQE sent, by the server by using the second RDMA transceiver circuit, to the first RDMA transceiver circuit; and
the first conversion circuit is further configured to:
parse the second WQE into the NVMe completion instruction.

15. A server comprising:
a second remote direct memory access (RDMA) transceiver circuit configured to:
receive an non-volatile memory express (NVMe) instruction sent by using remote direct memory access RDMA by a terminal having no submission queue (SQ) for NVMe, and write, upon reception of the NVMe instruction, the NVMe instruction into a SQ that is set in the server according to an NVMe protocol, wherein the NVMe instruction indicates a data read operation or a data write operation; and
a processor;
a memory storing a program to be executed in the processor, the program comprising instructions for reading the NVMe instruction from the SQ, wherein the second RDMA transceiver circuit is further configured to:
when the NVMe instruction indicates the data read operation, send a to-be-read data to the terminal by using the RDMA; or when the NVMe instruction indicates the data write operation, receive, by using the RDMA, to-be-written data sent by the terminal;
wherein the program comprises further instructions for generating an NVMe completion instruction; and
the second RDMA transceiver circuit is further configured to send, by using the RDMA, the NVMe completion instruction to a completion queue (CQ) that is stored in the terminal for the NVMe, the CQ in the terminal being configured according to the NVMe protocol.

16. The server according to claim 15, wherein the second RDMA transceiver circuit comprises:
a second transceiver circuit configured to receive a first work queue element (WQE) sent by a first RDMA transceiver circuit of the terminal; and
a second conversion circuit configured to parse the first WQE into the NVMe instruction.

17. The server according to claim 16, wherein the second transceiver circuit is further configured to initiate an RDMA read operation to the first RDMA transceiver circuit.

18. The server according to claim 16, wherein the second conversion circuit is further configured to convert the NVMe completion instruction into a second WQE supported by the RDMA.

19. The server according to claim 18, wherein the second transceiver circuit is further configured to send the second WQE to the first RDMA transceiver circuit.

* * * * *